Nov. 15, 1938. W. A. BERGSTROM Re. 20,916

METHOD OF MAKING SPRING LOCK NUTS

Original Filed May 27, 1935

INVENTOR.
William A. Bergstrom.

BY

Chas. E. Townsend.
ATTORNEY.

Reissued Nov. 15, 1938

Re. 20,916

UNITED STATES PATENT OFFICE 20,916

METHOD OF MAKING SPRING LOCK NUTS

William A. Bergstrom, Chicago, Ill., assignor to Renchtite Spring Nut Company, San Francisco, Calif., a corporation of California Original No. 2,035,859, dated March 31, 1936, Serial No. 23,629, May 27, 1935. Application for reissue October 14, 1937, Serial No. 169,075

6 Claims. (Cl. 10—86)

This invention relates to spring lock nuts, and to the method of making them.

An object of my invention is the provision of nuts which, when applied, are self-locking by their spring action and which may be used a plurality of times without permanent set or deformation taking place therein while they are in functioning position, that is, while under normal strain.

Another object of my invention is to provide a method of making such spring lock nuts.

Other objects of the invention will be apparent on reading the appended specification.

Referring to the drawing which forms a part of this specification—

Figure 1:
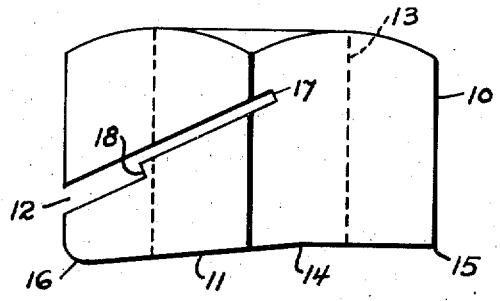
Fig. 1 is an elevation of the nut itself.

The nut 10 follows the usual standards as to its various dimensions for practical purposes, and it may be of any desired shape, that is, square or hexagonal.

It differs from standard nuts as to its base 11 and in being provided with a slot 12. The bore of the nut is indicated at 13, and the base of the nut from the point 14 to the edge 15 lies in a plane at right-angles to the axis of the bore. The base of the nut, however, slopes downwardly from the point 14 to the outer edge 16 which is rounded, so that when the nut is screwed down, the part 16 will contact first for a purpose which will now appear.

On the same side of the nut as the part 16, I provide the stepped slot 12, which enters the nut from the lower part thereof and is directed obliquely upwardly to a point 17 which is past the axis of the nut. The slot may be comparatively narrow at its inner part, and is provided with a shoulder 18 whereby the slot is wider at the outer part of the nut than at the inner.

Figure 2:
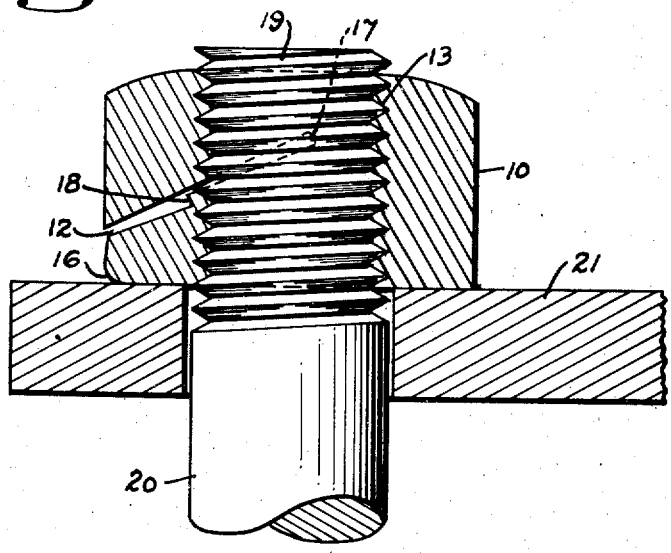
Fig. 2 is a sectional view showing the nut in applied position.

On Fig. 2 I illustrate the nut 10 applied to the threaded end 19 of a bolt 20 against a work surface or other suitably supported element 21. As the nut is turned down, the part 16 contacts first with the element 21, and as it is turned further, it becomes necessary for the part of the nut which is below the slot to bend upwardly with respect to the rest of the nut and this is permitted by the slot. As a result, the threads below the slot are given a clamping action when the nut is forced tightly into position.

I make my nuts of a material which is well adapted to the functions and purposes above indicated. This material should be strong and tough, having sufficient resiliency to cause the bending or locking action required, yet not be subject to permanent deformation by being used. It should be of such a character as to be easily milled or cut in order that the slotting operation may be effected at minimum cost, and it should also respond properly to the process of hardening. The material should be such that the threads may be thrown out of alignment by the normal use of the nut, and then returned to exact alignment when the nut is removed from the work so that the nut may be used again. The nut may be made of any suitable material having the above-indicated character, and I have found that steels having a carbon content of about 0.4% to 0.6% are well adapted for this purpose and while the carbon content may be varied above and below these limits without departing from the spirit and scope of this invention, the best results, where steel is the metal used, may be said to be obtained when the carbon content is between these limits, preferably between 0.5% and 0.6%.

In the manufacture of the nuts I ordinarily start with flat bars from which the nut-blanks may be made, preferably by hot-forging although other methods, such as cold punching and rolling, are well adapted to the purpose. In making these blanks the base of the nut is given the peculiar shape above described. The slots may be produced by cutting, broaching, milling, or any other suitable method, and this slotting may be performed cold.

After slotting, the blank is tapped, that is, threads are cut interiorly in the bore, and it is important that the slotting operation precede the tapping operation in order to avoid damage to the threads, which may occur if the nut be slotted after the threads are present.

Thereafter the nuts are hardened by heating, drawing and quenching in order to develop the required resiliency or springiness therein; and this must be so great that the slot will re-open to its normal position on removal of the nut from the work, or at least as nearly so as is required to re-align the threads to their normal alignment, even after the slot has been entirely closed by pressure.

When the steel above described is used, the hardening is best to a point within the range of 255 to 302 on the Brinell scale of hardness, although variation above or below this range may be used in carrying out this invention to produce nuts having the characteristics herein above described.

I have referred to various details by way of illustration, but it is to be understood that various changes may be made without departing from the spirit of the invention the scope of which is defined in the appended claims.

Having described my invention, what I claim and desire to secure by Letters Patent is:

1. The method of making a spring nut which consists in first utilizing for this purpose a bar of steel of a strong, tough, free milling nature containing about 0.4% to 0.6% carbon, then hot-forging the bar to the desired shape of the nut and forming the nut blank, then slotting the nut blank and subsequently thereto tapping the nut blank, and finally hardening the nut by a heating, drawing and quenching operation to a degree equivalent to a Brinell hardness test which lies within a range comprising the range of 255 to 302.

2. The method of making a spring nut which consists in first utilizing for this purpose a bar of steel of a strong, tough, free milling nature containing about 0.5% to 0.6% carbon, then hot-forging the bar to the desired shape of the nut and forming the nut blank, then slotting the nut blank and subsequently thereto tapping the nut blank, and finally hardening the nut by a heating, drawing and quenching operation to a degree equivalent to a Brinell hardness test of about 255 to 302.

3. The method of making a spring nut consisting in using a bar of strong, tough, free milling steel having sufficient carbon content to provide the aforesaid characteristics, hot forging the bar to the shape of the nut and forming the nut blank, slotting the nut blank and subsequently tapping the blank, and hardening said nut by heating, quenching and drawing it before final completion to develop the resiliency required to cause the nut and parts thereof to assume initial shape or position after being flexed.

4. The method of making a slotted spring nut having that portion of its inner face corresponding to the slot angularly disposed to the remainder of said face, consisting in forging a bar of strong, tough, free milling metal to the external shape of the nut including said angularly disposed face portion to form the nut blank, slotting the nut in alignment with the angularly disposed face portion, tapping the blank, and finally hardening the nut by heating, quenching and drawing it to develop the resiliency required to cause that portion of the nut between the slot and said angularly disposed face portion to return to its initial position after being held flexed.

5. The method of making a slotted spring lock nut wherein the slot lies at an acute angle to the normal outer and inner faces of the nut and that portion of the inner face of the nut aligned longitudinally of its axis with the slot is angularly disposed to the remainder of such face consisting in employing a bar of strong, tough, free-milling metal, forging a nut blank therefrom having the required external shape including said angularly disposed face portion, creating a bore in the blank so formed, angularly slotting the blank in alignment longitudinally of the axis of the nut with the angularly disposed face portion of the blank, tapping the bore of the blank, and hardening the nut by heating, quenching, and drawing to develop the resiliency required to return that part of the nut defined by the slot and the angularly disposed face portion to its normal position after distortion or flexing.

6. The method of making a spring lock nut consisting in forming a blank to the desired external shape with a portion of its inner face angularly disposed to the remainder thereof, forming a bore in the blank, slotting the blank at an angle to the faces thereof in alignment longitudinally of its axis with said angularly disposed portion of the inner face, threading the bore of the blank, and hardening the nut thus formed by heating, quenching and drawing, whereby it will have the resiliency to return that portion thereof defined by the slot and the angularly disposed portion of the inner face to its normal position after distortion or flexing.

WILLIAM A. BERGSTROM.